April 16, 1974 J. M. McQUADE 3,804,793
MAKING POLYAMIDE-ACID AQUEOUS DISPERSIONS FOR ELECTROCOATING
Filed Oct. 23, 1970

INVENTOR.
James M. McQuade,
BY John M. Stoutt
Attorney.

United States Patent Office 3,804,793
Patented Apr. 16, 1974

3,804,793
MAKING POLYAMIDE-ACID AQUEOUS DISPERSIONS FOR ELECTROCOATING
James M. McQuade, Fort Wayne, Ind., assignor to General Electric Company
Filed Oct. 23, 1970, Ser. No. 83,446
Int. Cl. C08g 51/24; C09d 5/02; C23b 13/00
U.S. Cl. 260—29.2 N
9 Claims

ABSTRACT OF THE DISCLOSURE

Resin materials can be electrodeposited from aqueous systems and thicker film buildups achieved when the resin is in the form of a dispersion. The dispersion is prepared by first forming polymeric materials in an anhydrous solvent system, the reactants being substantially acid free. A base material such as ammonia or its equivalent is added to react with a portion of the carboxylic units on the resin chain. Sufficient numbers of these carboxylic units are reacted so that upon addition of water the resin will be precipitated as a relatively fine dispersion. An ion exchange resin is added to decrease the concentration of the resin which is in continuous phase since one of the principal discoveries of the present invention is that thicker electrodepositions can be obtained by reducing the amount of resin in the continuous phase.

Figure 1:
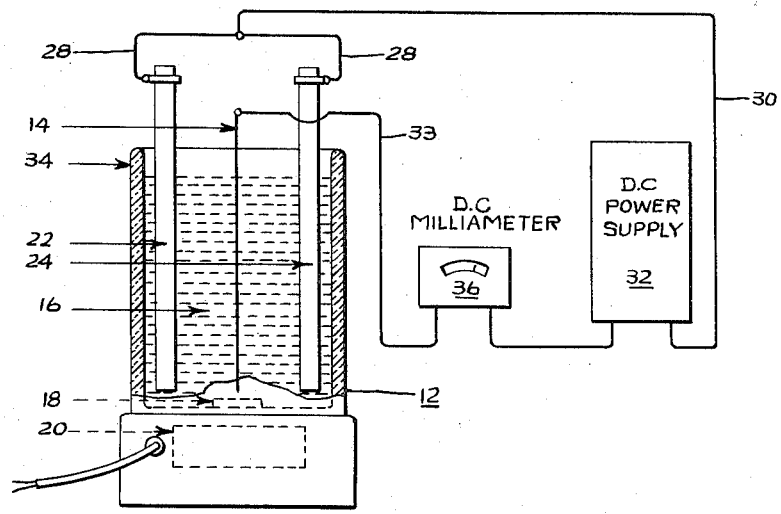

The ion exchange resin reacts with the cation which has rendered the resin water soluble and by decreasing the resin water solubility the dissolved phase resin becomes part of the dispersion which is electrodeposited.

BACKGROUND OF THE INVENTION

The present invention relates to a process for producing an improved electrodepositable dispersion of a polyamic acid polymer. More particularly, the invention relates to a process for producing an improved dispersion of a polyamic acid polymer wherein the amount of polyamic acid in the dispersed phase is increased without the production of heavy non-electrodepositable curds.

One of the shortcomings of the prior art is the relative inability to achieve electrodeposited coatings in excess of approximately 0.5 mils. When it is attempted to electrodeposit to greater thickness, there is a rapid dropoff in current flow after thicknesses of the order of 0.5 mils are achieved, and thereafter it has proved quite difficult to obtain any additional thickness of electrodeposition. Consequently, the problem of obtainment of satisfactory thickness for electrodepositions was of long duration and it is only quite recently that any degree of success has been achieved in obtaining increased orders of film thickness buildup by forming dispersions of the resin and electrodepositing such dispersions. The use of dispersions will lend itself to substantial increase in the amount of film thickness buildup which can occur. When electrodepositing from a dispersion, there are two distinct phases of the resin, the one being a dispersed or discontinuous phase and the other a solution or continuous phase. It has been discovered, that when current is first passed through a dispersion of the type illustrated in my co-pending application, Ser. No. 18,818, filed Mar. 12, 1970, entitled "Electrodeposition of Resins From Aqueous Dispersions," now abandoned, and assigned to the same assignee as the present application, there first occurs a substantial electrodeposition buildup at the anode because of the relatively low resistivity of the system. It is known that the solution phase polymer is more readily electrodeposited, and consequently, electrodeposition of the solution phase resin proceeds preferentially to electrodeposition from the dispersed phase. However, electrodeposition from solution phase tends to greatly increase the resistance of the system after a brief period of time and before acceptable orders of thickness are achieved by anodic coating operation. In spite of the fact that greater magnitudes of electrodeposition thickness can be achieved in my referenced application "Electrodeposition of Resins From Aqueous Dispersions," (spura) it has been discovered that the resin which remains in solution or continuous phase tends to interfere with, and is therefore a limitation to, the attainment of even thicker electrodeposited coatings.

The principal object of the present invention is to provide a process for preparing a dispersion of an electrodepositable polyamic acid in an aqueous-organic liquid medium for use in electrodepositing substantially thicker layers of the polyamic acid than have heretofore been achieved.

Another object of the present invention is to provide an improved dispersion of electrodepositable polyamic acid polymer in an aqueous-organic liquid medium, in which an increased proportion of the polyamic acid polymer is in the dispersion or the discontinuous phase as compared to the solution or continuous phase, without the production of heavy non-electrodepositable curds.

A further object of the present invention is to provide a method of preparing an improved dispersion of polyamic acid in an aqueous-organic liquid medium, without the production of heavy non-electrodepositable curds, in order to increase the resistivity of the liquid medium, thereby to facilitate the formation of thicker electrodeposits of the polyamic acid polymer on a conductive substrate.

A more specific object of the invention is to provide a process of the foregoing type for reducing or squeezing out a portion of the soluble polyamic acid polymer from solution in the aqueous-organic liquid portion of a dispersion of such polymer to form additional dispersed polyamic acid polymer as a dispersed phase without the formation of heavy non-electrodepositable curds of polyamic acid.

Other objects and advantages of the present invention will become apparent from the following description of the preferred embodiment, taken in connection with the accompanying drawings wherein:

DRAWINGS

Figure 2:
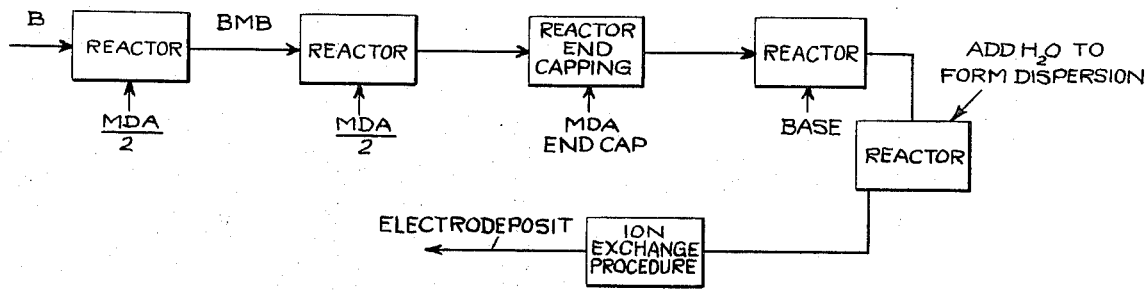
Figure 3:
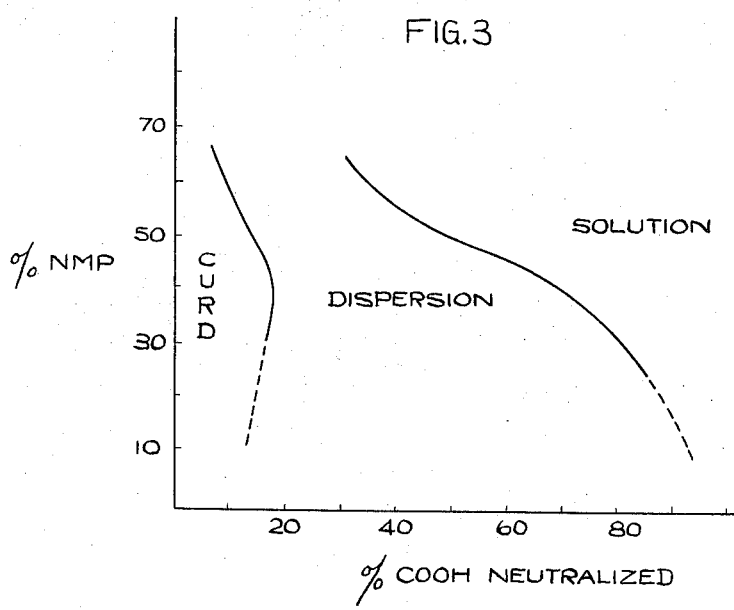

FIG. 1 is a schematic view of the electrocoating apparatus which is used in the present invention;
FIG. 2 is a block diagram showing the steps used in preparing the polymer for electrodeposition;
FIG. 3 is a graph illustrating percent COOH neutralized vs percent of one type of solvent and showing dispersion, curd, and solution phases of a polymer as a function of COOH neutralized upon the addition of water to an organic solvent system.

GENERAL DISCUSSION OF THE INVENTION

The main objective of the present invention is to provide an electrocoating process which avoids a substantial difficulty of electrodepositing operation to produce stable, defect-free coatings especially adapted for insulation coatings on magnet wire. Materials which I have produced in accordance with this invention are stable aqueous dispersions, and I can easily electrodeposit films in excess of 2 mils per substrate. The wet strength of the electrodeposited film is adherent and cohesive and the cured film can pass a 25% elongation and can be wound on its own diameter without injuring the coating.

I produce the dispersion by interreacting resinous materials such as benzophenonetetracarboxylic dianhydride (B) together with a diamine such as methylenedianiline (M) within an anhydrous solvent system, as for example N-methyl-pyrrolidone (NMP) in accordance with the following reaction:

2B+M→BMB 

and

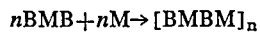

and, the reaction product is then encapped or terminated by adding additional M in accordance with the reaction

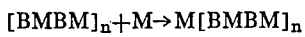

I next add an amount of base material so that approximately 4%–80% of the carboxylic radicals on the polymer chain are neutralized in accordance with the reaction:

The method of preparation of the polyimide prepolymer is fully set forth in copending application Ser. No. 851,835, filed August 21, 1969, now U.S. Pat. No. 3,652,500, issued Mar. 28, 1972, to M. A. Peterson, for "Process for Producing Polyamide Coating Materials by Endcapping," and assigned to the same assignee as the present application.

The amount of base added is bracketed between two considerations: the lower limit of base added is sufficient so that upon addition of water the entirety of the polyamide will not drop completely out of solution in the form of heavy curds and hence be non-electrodepositable, and the upper limit of base addition is dictated by the fact that the resulting polymer should not be completely water-soluble. Ideally, enough base is added so that when the system is converted from an organic to a mixed water-organic base, the polyamic acid or other resin material is precipitated as a milky white dispersion with particle sizes of 0.5 microns or less. Once the polymer is formed as described, water is then added to the mixture so that no less than 40% of the resin is precipitated as a discontinuous phase dispersion. The water addition and base additions are interdependent in arriving at the 40% dispersion value, and reference to this degree of dispersion is specific to the BPDA-MDA system and is suggested as a guide to those skilled in the art to achieve correct amounts of base and water addition in obtaining other suitable dispersions for the various resin systems encompassed in this invention.

After securing the dispersion, I then reduce the cation of the base addition which has reacted with the pendant carboxylic units on the backbone of the resin chain by exchanging such cations with an ion exchange resin, as for example a co-polymer of styrene and divinyl benzene which is a relatively strong acid ion exchange resin. The backbone of the styrene-divinyl benzene includes pendant sulfonic acid groups and the ion exchange reaction may be described in the following manner:

(Solution Phase)

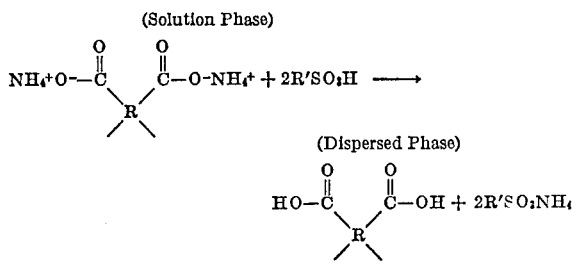

For optimum electrocoating operations, it has been found that larger molecular weights of resin lead to superior coatings and details of this particular feature are fully contained in co-pending application Ser. No. 822,899, filed May 8, 1969, by M. A. Peterson for "Improved Process for Producing Wire Coatings From Prepolymeric Materials" and assigned as the present application, to the same assignee.

For a practical guide as to how much base may be added in making the polymer water soluble, reference may be made to co-pending application Ser. No. 803,037, filed Feb. 27, 1969, by M. A. Peterson for "Improved Process for Producing Coating Materials" and the method of preparation of polyamide prepolymers is contained in copending application Ser. No. 851,835, filed Aug. 21, 1969, now U.S. Pat. No. 3,652,500, issued Mar. 28, 1972, to M. A. Peterson, for "Improved Process for Producing Polyamide Coating Materials by Endcapping" and assigned to the same assignee as the present application.

Any resin in general may be used in the present invention if, upon the addition of base it is solubilizable, either partially or wholly, in an aqueous system. The only requirement is that the ratio of resin in solution phase to resin in dispersed phase becomes the controlling feature and the extent to which an electrodeposited film can be formed. In general, the resin systems which has been found particularly suitable is the polyamic acid system.

Polyamic acid polymers include recurrent units having carboxylic acid pendant groups which are reactable with a base to render the polymer only partially water soluble and which is later formed into a dispersion upon adding water. The resin system is derived from, by way of general formula:

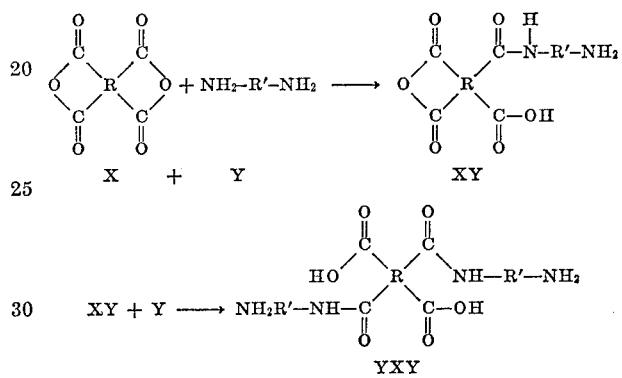

Where R is a tetravalent radical having benzenoid unsaturation and R' is a divalent radical. More specifically as an example of the resin system, there is used 3,3',4,4'-benzophenonetetracarboxylic dianhydride and 4,4'-methylene dianiline condensation polymer:

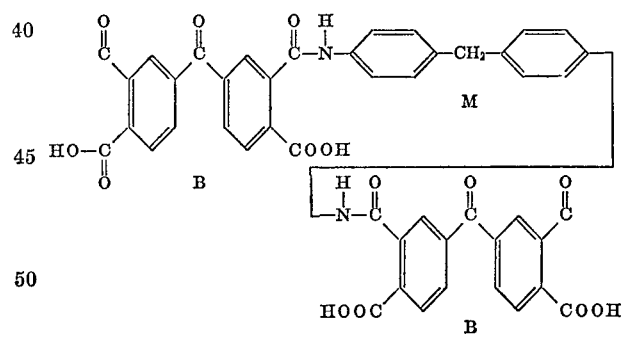

zipped up with M.

Referring to FIG. 2, after having obtained the desired molecular weight and amount of base to be added for the percent COOH neutralized (FIG. 3) water is then added so that the percent M for the particular percent COOH neutralized will produce an acceptable dispersion.

After the dispersion is formed, the so-resulting preparation is then treated with an ion exchange resin to decrease the percent of polymer in solution and thereby improve the electrodepositability of the dispersion. Various polyamic acid polymers can be used in accordance with the present invention and encompass all of those described in my co-pending application Ser. No. 18,818 filed Mar. 12, 1970, for "Electrodeposition of Resins From Aqueous Dispersions."

SOLVENT

The solvents which are used for the solution phase are organic solvents whose functional groups are non-reactive with either of the reactants which make up the resin and besides being inert to the system, the solvent must serve to solvate at least one of the reactants and preferably both of the reactants. Acceptable solvents include dimethylsulfoxide, N-methyl-2-pyrrolidone, N-methylcaprolactam, tetramethylene urea, pyridine, dimethylsulfone, hexamethy-phosphoramide, tetramethylenesulfone, formamide, N-methylformamide, N,N-dimethylformamide, butyrolactone, and N-acetyl-2-pyrrolidone. The solvents can be used alone, as mixtures or in combination with the poor solvents such as benzene, toluene, cresylic acid, xylene, dioxane, cyclohexane or benzonitrile. After the polymer is formed and is polymerized to the preferred molecular weight range and is imidized to the preferred degree, the carboxyl units along the polymer chain are next reacted with the base material, either as an aqueous or an organic solution.

BASE MATERIAL

The base material may consist of ammonium hydroxide, dimethylethanolamine (DME), methyldiethanolamine (MDEA), triethanolamine (TEA), triethylamine (TE amine), and diethanolamine (DEA). The amount of base added is that necessary to form a stable dispersion upon the addition of water, i.e., the percent COOH neutralized to achieve the goal area labelled "Dispersion" in FIG. 3. The base addition and the water addition are the two controlling parameters which determine the percent dispersion in each instance. The polyamide prepolymer having been treated with base will consist of recurrent units in which the carboxylic groups have been neutralized and have the formula:

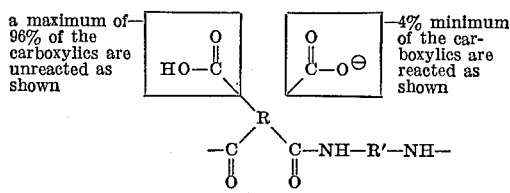

R and R' are defined as follows: R is a tetravalent radical containing at least one ring of six carbon atoms and having benzenoid unsaturation, each pair of carboxyl groups being attached to different adjacent carbon atoms, and R' is a divalent radical selected from the class consisting of:

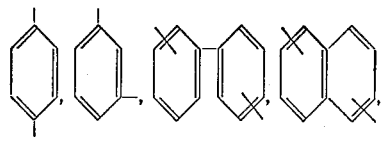

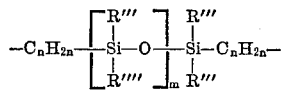

where R''' and R'''' are an alkyl or an aryl group having 1 to 6 carbon atoms, $n$ is an integer of from 1 to 4 and $m$ has a value of 0, 1 or more, and

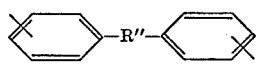

wherein R'' is selected from the group consisting of an alkylene chain having 1–3 carbon atoms,

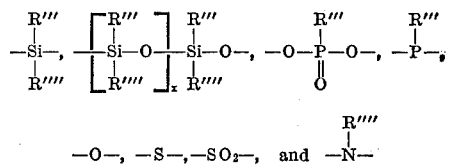

wherein R''' and R'''' are as above defined and $x$ is an integer including 0.

The amount of electrodepositable resin will increase if the composition is treated with a cation exchange resin to increase the amount of polymer dispersed at the expense of that dissolved in the continuous phase. Examples were prepared in the following manner:

Example 1

A reactor equipped with a mixing agitator and a cooling jacket was flushed with dry nitrogen, dewpoint −65° C. To the reactor was charged 53,170 g. N-methyl-2-pyrrolidone (0.01% water), followed by 6954 g. 3,3',4,4'-benzophenonetetracarboxylic dianhydride, B (99.2% purity). The agitator was run for a period of 1.0 min. Then 2132 g. of p,p'-methylene dianiline, M (99.9% purity) was added, slowly, with agitation over a period of 3 min. and the agitation continued for a period of 15 min. forming the BMB precursor, a clear solution with the temperature maintained at 25° C. To the BMB precursor was added slowly, over a period of 15 min. with agitation, 2184 g. of p,p'-methylene dianiline with agitation. During this period the temperature rise was controlled to a max. of 40° C. Agitation was continued for another 30 min. and the product withdrawn as the polyorthoamic acid. The carboxylic acid content was determined by titration in pyridine to a thymol blue end point with t-butylammonium hydroxide. The kinematic viscosity was 2560 cps. at 23.8° C. when reduced to a solids level of 17.5%. The percent imidization was determined to be 0.7±0.5%, or essentially a negligible amount. The inherent viscosity of this stock polymer solution was determined in N-methyl-2-pyrrolidone at 37.8° C. and found to be 0.64 dl./g. at C=0.500 g./dl. 7800 g. of the polyorthoamic acid was treated with 18.7 g. of BPDA predissolved in 480 g. NMP while stirring over a period of a half hour and the temperature controlled at 38±3° C. The level of imidization was about 2%. This inherent viscosty for the polyorthoamic acid was 1.14 dl./g. measured at C=0.500 g./dl. in NMP at 37.8°, and a dispersion then formed of Example 2 in the following manner:

DISPERSION

Example 2

| | Grams |
|---|---|
| Example 1 | 100 |
| NMP | 69 |
| Ethylene glycol | 44 |
| Water | 110 |
| Siloxane solution | 1.53 |

The so-prepared dispersion was then divided and compared as A and B compositions. A was treated with an ion exchange resin consisting of a co-polymer of styrene and divinyl benzene in a sulfonic acid form, and the other sample B was untreated. The treated composition has a ratio of 24/1 polymer dispersed to polymer dissolved and the untreated composition has a ratio of 4.9/1. Coating was then effected with cold, drawn iron rods ⅛" in diameter immersed to a level of 2.5" in the dispersion, the rods having been first cleaned in a dilute hydrochloric acid and washed with water. The results are shown in the following table.

TABLE 1

| | Composition "A" [1] | Composition "B" [2] |
|---|---|---|
| Current (ma.) | 10 | 10 |
| Time (sec.) | 60 | 40 |
| Thickness (mils) | [3] 1.2 | [4] 0.3 |

[1] Treated with ion exchange.
[2] Untreated with ion exchange.
[3] No bubbles in coating.
[4] Bubbles in coating.

COMPOSITION A
(Shows thickness reaction with time and current)

| Current (ma.) | 5 | 5 | 5 | 10 | 10 | 10 | 10 |
|---|---|---|---|---|---|---|---|
| Time (min.) | 2 | 4 | 5 | 1 | 2 | 3 | 4 |
| Thickness or radius (mils) | 1.1 | 2.3 | 2.85 | 1.2 | 2.55 | 4.1 | 4.9 |

These experimental results will substantiate not only that thicker coatings were obtained but there were no bubbles obtained in the coating of the first composition as compared with the second composition.

Example 3

7800 grams of the polyorthoamic acid solution of Example 1 having an inherent viscosity of 0.60 dl. per gram measured at C=0.500 g./dl. in NMP at 37.8° C. and an imidization level of 2% was placed in a reactor under nitrogen and equipped with a heating jacket. Then to this 4.68 grams of BPDA predissolved in 4800 grams NMP was added continuously over a period of 5 minutes with agitation. Stirring was continued for an additional half hour with the temperature controlled at 38±3° C. and a level of imidization of about 2%. The inherent viscosity of the polyorthoamic acid was 0.83 dl. per gram measured at C=0.500 dl./g. in NMP at 37.8° C.

The material of Example 2 was then treated in the following manner:

Example 4

95 grams Example 3 (17.3% solids),
74 grams NMP and mix for two minutes,
3.0 cc. of 2.0 N-methyldiethanolamine and mix two minutes,
44 g. ethylene glycol—mix two minutes,
110 grams H$_2$O via a slow, steady stream with blender agitating.

The resulting product is a creamy-white dispersion with a consistency of milk. The solids content is approximately 5.2% by weight polyamic acid and the mixture has a specific resistance of 12,300 ohm-centimeters. Upon centrifuging it was discovered that approximately 85% of the polyamic acid is dispersed and 15% is dissolved. On an absolute basis, the concentration of polymer in the continuous phase is 0.83%. The resulting product is then ion exchanged with a co-polymer of styrene and divinyl benzene, which may be obtained from the Dow Company under the trademark "Dowex" 50W–X8. The material is approximately 92% styrene and 8% divinyl benzene and pendant sulfonic acid groups are present to the extent that there is an exchange capacity of 2.5 milliequivalents/gram of resin. For details of the exchange capacity, reference may be made to Dowex: Ion Exchange, the Dow Chemical Company, published 1958.

Either a batch, or column operation may be utilized in ion exchanging the dispersion. It has been discovered that for best results, approximately 50% of the sulfonic acid groups of the ion exchange resin should be neutralized with a suitable base such as methyl diethanolamine (MDEA) prior to effecting an exchange of the dispersion since a strongly acid ion exchange resin will cause the polyamic acid to precipitate over the outer surface of the beads of ion exchange material, thus inhibiting the ion exchange operation. During the described neutralization of the ion exchange resin I first calculate the amount of ion exchange resin required and add the appropriate amount of MDEA and stir for one hour. The product is then washed with distilled water and the ion exchange resin is then ready for use.

The correct amount of MDEA is calculated in the following manner. For 50 grams of the ion exchange resin in which the exchange capacity is 2.5 meq./gram: 50 grams ion exchange resin×2.5 milliequivalent per gram of ion exchange resin equals 125 meq. Since 62½ meq. of MDEA will neutralize 50% of the resin, then there must be added 62.5 meq. MDEA or:

$$62.5 \text{ meq. MDEA} \times \frac{\text{eq.}}{1000 \text{ meq.}}$$
$$\times \frac{119.16 \text{ g. MDEA}}{\text{eq. MDEA}} = 7.45 \text{ g. MDEA}$$

Therefore, 7.45 g. of MDEA are added to 50 grams of ion exchange resin in order to neutralize 50% of the pendant groups. To exchange the dispersion, I then place a given amount of dispersion in the beaker and stir magnetically. There is next a vigorous stirring and then is added 5 grams 50% neutralized ion exchange resin for each 100 g. of dispersion and the length of stirring time determines the extent of exchange which is measured indirectly by measuring the specific resistance of the preparation as a function of time. As soon as the desired specific resistance is obtained, the ion exchange resin is separated from the dispersion by filtration.

Example 5

A dispersion obtained in the manner indicated by Example 4 was ion exchanged in the following manner: 500 grams of dispersion of Example 3 were stirred magnetically and 25 grams of a 50% neutralized ion exchange resin consisting of 92% styrene and 8% divinylbenzene was introduced into the same beaker. After stirring for 10 minutes, the ion exchange resin was filtered out and the following data collected on the polyamic acid dispersion:

Specific resistance, ohm-cm. _____ 27,750
Total solids (polyamic acid) percent _____ 5.18

Concentration of polyamic acid in a continuous phase (weight %) is 0.38% which is equivalent to 7.3% of all solids present.

Example 6

Same as Example 5 but continue stirring for 16 minutes

Specific resistance, ohm-cm. _____ 46,400
Total solids (polyamic acid), percent _____ 5.21
Concentration of polyamic acid in continuous phase (weight percent) _____ 0.23
Percent of total solids in continuous phase, percent _____ 4.3

Example 7

Same as Example 5 but stirring continued for 20 minutes:
Specific resistance, ohm.-cm. _____ 60,300
Total solids (polyamic acid), percent _____ 5.22
Concentration of polyamic acid in continuous phase _____ 0.19
Percent of total solids in continuous phase _____ 2.3

The foregoing Examples 5, 6 and 7 were then electrodeposited. The purpose of electrodeposition of Examples 5, 6 and 7 is to compare the thickness of the deposit obtainable from dispersion of polyamic acid which were ion exchanged to various degrees. It should be noted that there is an indirect but valid relationship between the increase of resistivity and the degree to which ion exchanging has taken place since ion exchanging causes the solution phase polymer to become precipitated from solution phase and since such solution phase is conductive, the conductivity indicates the amount present according to resistivity. The general relationship is, the greater the resistivity, the less there is of the polymer in the solution phase. Since the number of coulombs determines the thickness of the film, it is necessary to compare the various dispersions under the same conditions of time and current. In the following table, all of the samples were coated, using rectangular copper (0.095" x 0.175") wires which were immersed to a depth of 3 3/16" in the dispersion. Stainless steel cathodes were used and the copper wires were placed midway (2") between each, and the results of these electrocoatings were summarized in the following Table 2.

TABLE 2

Total build in mils of cured electrodeposits of polyamic acid on rectangular copper wire

| | Dispersions as prepared 12,300 ohm-cm. | Dispersion ion exchanged to— | | |
|---|---|---|---|---|
| | | 27,750 ohm-cm. | 46,600 ohm-cm. | 60,300 ohm-cm. |
| Current time: | | | | |
| 10 ma. 30 sec | 0.5 | 1.9 | 1.9 | 1.2 |
| 10 ma. 60 sec | 0.9 | 3.3 | 4.1 | 1.9 |
| 10 ma. 120 sec | 2.2 | 5.3 | 8.5 | 4.0 |
| 10 ma. 180 sec | 3.3 | 8.3 | 10.5 | 5.9 |
| 20 ma. 30 sec | 2.2 | 5.8 | 5.5 | 4.4 |
| 20 ma. 120 sec | 4.3 | 13.2 | 14.5 | 8.3 |
| 20 ma. 180 sec | 5.8 | | 16.5 | 12.6 |
| 30 ma. 30 sec | 1.4 | 4.5 | 3.5 | 4.1 |
| 30 ma. 60 sec | 2.9 | 9.0 | 6.5 | 6.2 |
| 30 ma. 120 sec | 5.9 | | 16.5 | 12.5 |
| 30 ma. 180 sec | | | 21.5 | 20.8 |

From examining the results of Table 2, it will be seen that thicker films are obtainable with an ion exchanged dispersion and the coulombic yield is also greater for ion exchanged dispersions. It will further indicate that improvement in obtaining either coulombic yield or ultimate thickness does not extend beyond about 46,600 ohm-cm. specific resistance, and a preferred special resistance is in the range of 20–40,000 ohm-cms. When iron rods are substituted for copper used as test specimens, the following results are obtained using iron rods of 1/8" diameter immersed to a depth of 3 3/16".

TABLE 3

Total build in mils of cured electrodeposits of polyamic acid on iron rods

| | Dispersions as prepared 12,200 ohm-cm. | Dispersion ion exchanged to— | | |
|---|---|---|---|---|
| | | 27,750 ohm-cm. | 46,600 ohm-cm. | 60,300 ohm-cm. |
| 10 ma. −3 min | (¹) | 7.4 | 9.0 | 8.6 |
| 10 ma. −4 min | (¹) | 8.5 | 11.0 | 9.9 |
| 20 ma. −2 min | (¹) | (¹) | 11.0 | 11.4 |
| 30 ma. −1½ min | (¹) | (¹) | 11.0 | 11.7 |

¹ Pinhole bubble.

The foregoing data indicates that dispersions which are ion exchanged will produce thick, pinhole-free coatings on iron whereas dispersions which were not ion exchanged have pinholes and bubbles within the coating.

Increasing the concentration of resin in the dispersion from 5% to 10% by weight of polyamic acid has also been investigated.

The polymer used to prepare this dispersion is the same as indicated in Example 3, and the procedure for preparing the aqueous dispersion is as follows:

Example 8

151 grams of polymer solution prepared in the manner indicated by Example 3, 36 grams ethylene glycol and mix for 2 minutes, 8.00 cc. of 2.0 N methyl diethanolamine were then added and mixed for 2 minutes, 85 g. of water added and at a slow, steady stream with blender agitation.

The procedure produced a tan-white dispersion with the consistency of milk, and the solids content was approximately 10.0% by weight polyamic acid and has a specific resistance of 5,000 ohm-cm. By centrifuging the dispersion, it was learned that approximately 82% of the polyamic acid is dispersed and 18% was dissolved in the continuous phase. On an absolute basis the concentration of polymer in the continuous phase is 1.8%. The dispersion produced was then treated with ion exchange resin previously described but unneutralized.

Example 9

125 gm. of the dispersion produced in Example 3 was stirred magnetically, 15 ml. (30 meq.) of exchange resin was added and specific resistance monitored as a function of time until a resistance of 11,700 ohm-cm. was attained. The following results were obtained:

| Time stirring | Specific resistance (ohm-cm.) |
|---|---|
| 0 | 5,000 |
| 2 hours, 20 minutes | 6,190 |
| 3 hours, 55 minutes | 7,600 |
| 4 hours, 55 minutes | 8,900 |
| 5 hours, 55 minutes | 10,400 |
| 6 hours, 55 minutes | 11,700 |

About four times as much exchange capacity is available than was used with the 5% dispersion and upon filtering it was learned that the exchange resin and polyamic acid dispersion had a solids content of about 9.93%.

Electrodeposition then was carried out with the foregoing examples at 10% concentration as compared with unexchanged dispersion of the same composition. All of the electrocoating results were carried out with rectangular aluminum wire (.095" x .175") and each sample immersed to the same depth in the dispersions under consideration. Stainless steel cathodes were used and the aluminum wires placed midway between each. The results of electrocoating are obtained from the following table:

TABLE 4

Total build in mils of cured electrodeposition polyamic acid on rectantular aluminum wire

| | 10% dispersion (as prepared) 5,000 ohm-cm. | 10% dispersion after ion exchange 11,700 ohm-cm. |
|---|---|---|
| 20 ma. −10 sec | | 2.0 |
| 20 ma. −15 sec | 0.7 | 2.6 |
| 20 ma. −20 sec | 0.9 | |
| 20 ma. −25 sec | 1.0 | 4.7 |

Comparing the electrodeposition results of the 10% dispersion as compared with the 5% dispersion, it will be seen that a thicker buildup can be obtained with lower concentration resins by "squeezing out" solution phase polymer with the ion exchange resin.

An important feature of the present invention is that the degree of "squeeze out" of the solution phase resin can be readily determined by monitoring the conductivity during the time that the ion exchange resin is reacting with the dispersion, the general relationship being that as the conductivity decreases, successively more and more of the solution phase resin is precipitated and occurs as part of the dispersion phase.

It is thought that one of the reasons why thicker electrodeposits can be made by using the ion exchange is that coatings which are developed from solution phase resin tend to build up as somewhat denser sublayers upon the anode and this will inhibit further film buildup. Without the ion exchange resin therefore, the initial electrocoating proceeds by a deposition of the solution phase resin preferentially to the resin in the dispersion phase, and as soon as solution phase resin deposits there is a substantial increase in resistivity which prevents further electrocoating of the dispersion phase, and thereby limiting the extent of electrodeposition.

ELECTRODEPOSITING APPARATUS

In electrodepositing the foregoing examples of the invention, one acceptable form of the apparatus is that indicated in FIG. 1, indicated by reference numeral 12.

A copper wire anode 14 is submerged in the aqueous solution 16 which is stirred by a magnetic stirring bar 18 activated by the magnetic stirrer 20. Two spectrographic grade 7.5 mm. size carbon electrodes serve as cathodes 22, 24 and are connected by conductors 28, 30 to a direct current constant power supply 32 with a voltmeter. A milliammeter 36 is connected in series through conductor 33 to the anode 14.

The anode copper wire 14 is degreased, acid cleaned and water rinsed before coating. The aqueous dispersion is held in an inert container 36 such as glass.

Applying the foregoing teachings, those skilled in the art can obtain consistent high quality resin coatings from dispersions produced by the present teaching, beyond those heretofore by the prior art. By "dispersion" the term is given its ordinary meaning to include a suspension of particles within a liquid continuous phase of organic and water solvent.

When less than 4% of the carboxy units of the resin are neutralized, then upon addition of water the resin will precipitate as a curd. The upper limit in percent of carboxy units neutralized by the addition of basis dictated by the minimum amount of resin precipitated as a dispersion upon the addition of water. I have found that when substantially less than about 40% of the resin is in dispersed phase the principal benefits of the invention are not obtainable in the form of thicker coatings of electrodeposited resin. That is, only about in the order of 1.0 mil thickness of electrodeposition are obtainable. The upper limit of base addition is therefore a function of the resin system and of the 40% lower limit of precipitated resin obtained upon addition of water as before described.

Those skilled in the art should apply the teaching of this invention with an awareness that not only is the relative proportion of resin in the dispersed phase to solution phase an important factor but also the percent concentration of the resin in the contiuous phase. Inevitably during electrocoating some of the resin in the continuous phase will be deposited and the extent of such deposition has a deterrent effect on the extent of the buildup obtained from the dispersed phase resin. Therefore to obtain the principal benefits of the invention due care must be taken when proportioning the dispersed/continuous phase resin that the concentration of continuous phase resin be not excessive to the point that it will interfere with the improved buildup which is derived from the dispersed phase resin. As a general rule, I prefer to keep the concentration of continuous phase resin as low as possible, and I have found that should the concentration be excessive then the benefit of the invention will be reduced or nonobtainable. As a general guideline, those practicing the invention should avoid concentration of resin in the solution phase which exceeds 2-3% by weight of resin and preferably 1% or less of resin should be obtained.

Any ion exchange resin capable of operation at pH=7 or less is acceptable. Weakly acidic cation exchange resins such as Amberlite CG-50 which is a carboxylic (polymethacrylic) type is inoperative. This and like resins are operable when the pH is above 7. It is obvious that these weak acid resins are capable of exchanging until the pH is reduced to 7 at which time a strong acid exchange resin must be used.

While I have emphasized the applicability of my coating process to the production of magnet wire insulation enamels, it will be appreciated that my invention is also useful in many other areas. For example, the films formed in accordance to my invention may find use in all high temperature insulation applications. For example, stator and rotor slot insulators, transformers, cable casings, capacitors, and for various laminating processes. In each case the coating process will provide a low-cost, high-class insulator or bonding agent that can be used in place of existing materials. Other potential uses of my coating process of forming water-borne coating media with or without minor modifications, will occur to those skilled in the art, and I intend, therefore, in the following claims to cover all such equivalent variations as fall within the true spirit and scope of this invention.

What I claim as new and desire to secure by Letters Patent of the United States is:

1. A method of preparing an electrodepositable dispersion of polyamic acid in an aqueous-organic liquid medium for use in electrodepositing a polyamic acid coating on an electrically conducting substrate, comprising the sequential steps of:
    (a) preparing a solution of an aromatic polyamic acid in an anhydrous water-miscible organic solvent;
    (b) adding to said polyamic acid solution a base selected from the group consisting of ammonia, an organic amine and mixtures thereof in an amount sufficient to neutralize between about 4% and about 80% of the pendant carboxyl groups of said polyamic acid to render the polyamic acid only partially water soluble;
    (c) adding water to said base modified polyamic acid solution in an amount sufficient to effect precipitation of a first portion constituting at least about 40% of the polyamic acid as a dilute, stable dispersion of polyamic acid in an aqueous-organic liquid medium with the ratio of dispersed polyamic acid to dissolved polyamic acid being between about 4.5 to 1 to about 5.7 to 1; and
    (d) contacting said dispersion with an ion exchange agent reactable with the portion of the base modified polyamic acid dissolved in said aqueous-organic liquid to effect precipitation of a further portion of the dissolved polyamic acid as a stable dispersion with the ratio of dispersed polyamic acid to dissolved polymer acid being between about 42.5 to 1, without the formation of non-electrodepositable polyamic acid curds, the amount of polyamic acid in said aqueous-organic liquid medium being between about 5% and about 10% by weight with the dispersed particles of polyamic acid having a size not substantially greater than 0.5 micron, a coating of polyamic acid being electrodepositable from said medium onto a conductive substrate at a voltage of between about 5 and about 10 volts, to a thickness of between about 1.0 and about 2.5 mils and with the coating being substantially free of bubbles and pinholes.

2. The method as defined in claim 1 wherein the base is added to the polyamic acid solution in an amount sufficient to effect the precipitation of polyamic acid in an amount such that the remaining soluble polyamic acid portion is not substantially greater than about 3% by weight of the aqueous-organic liquid.

3. The method as defined in claim 2 wherein the polyamic acid is the reaction product of at least one aromatic dianhydride and at least one diamine selected from the group consisting of C alkylenediamines, m-phenylene diamine, and diamines having the formula

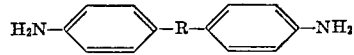

where R is a divalent radical selected from the group consisting of an alkylene having one to three carbon atoms,

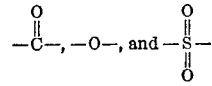

4. The method as defined in claim 3 wherein the water-miscible organic solvent is selected from the group consisting of: dimethylsulfoxide, N-methyl - 2 - pyrrolidone, N - dimethyl-methoxy-acetamide, N-methyl-caprolactam, tetramethylene urea, pyridine, dimethylsulfone, hexamethylphosphoramide, tetramethylenesulfone, formamide, dimethylacetamide, N-methylformamide, butyrolactone, and N-acetyl-2-pyrrolidone.

5. The method defined in claim 4 wherein said base material is a nitrogen containing base selected from the group consisting of: ammonia, dimethylethanolamine, methyldiethanolamine, triethanolamine, triethylamine, diethanolamine, morpholine, and mixtures thereof.

6. The method as defined in claim 1 wherein said ion exchange agent is a strong acid cation-exchange resin having pendant sulfonic acid groups.

7. The method as defined in claim 6 wherein at least 50% of said sulfonic acid groups are neutralized prior to addition of said agent to said aqueous-organic liquid medium.

8. The method as defined in claim 1 wherein said ion exchange agent is a strong acid cation-exchange resin which consists essentially of 92% styrene and 8% divinyl benzene, with pendant sulfonic acid groups in an amount equal to an exchange capacity of 2.5 milliequivalents per gram of resin.

9. The method as defined in claim 1 wherein said polyamic acid is the reaction product of:

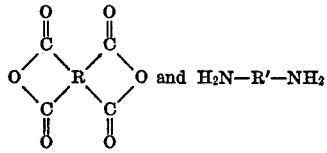

where R is a tetravalent radical containing at least one ring of 6 carbon atoms and having benzenoid unsaturation and the carboxyl groups of each pair of carboxyl groups are attached to different adjacent carbon atoms, and R' is a divalent radical selected from the class consisting of:

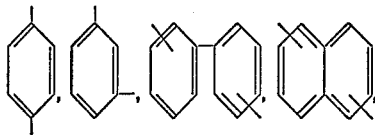

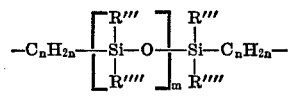

wherein R''' and R'''' are an alkyl or an aryl group having 1 to 6 carbon atoms, $n$ is an integer of from 1 to 4 and $m$ is an integer of 0 or more, and

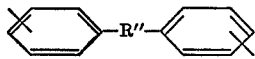

where R'' is selected from the group consisting of an alkylene chain having 1–3 carbon atoms, oxygen, sulfur, $-SO_2-$,

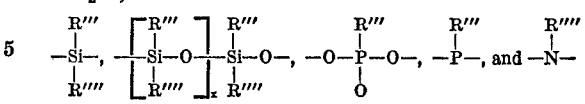

where R''' and R'''' are as above defined and $x$ is an integer of 0 or more.

References Cited

UNITED STATES PATENTS

| | | | |
|---|---|---|---|
| 3,230,162 | 1/1966 | Gilchrist | 260—29.2 R |
| 3,463,712 | 8/1969 | Coates | 204—181 |
| 3,488,272 | 1/1970 | Frisch et al. | 204—181 |
| 3,491,011 | 1/1970 | Lebras et al. | 204—181 |
| 3,536,641 | 10/1970 | Sekmakas et al. | 204—181 |
| 3,554,888 | 1/1971 | Seitz | 204—181 |
| 3,556,972 | 1/1971 | Seitz | 204—181 |
| 3,479,310 | 11/1969 | Dieterich et al. | 260—29.2 TN |
| 3,355,373 | 11/1967 | Brewer et al. | 204—181 |
| 3,444,066 | 5/1969 | Brewer et al. | 204—181 |
| 3,663,728 | 5/1972 | Hoback et al. | 260—29.2 N |

FOREIGN PATENTS

| | | | |
|---|---|---|---|
| 676,155 | 12/1963 | Canada | 260—29.2 VA |
| 1,033,833 | 6/1966 | Great Britain | 204—181 |

OTHER REFERENCES

Yeates: "Electroplating," October 1970, p. 52.

Burden et al: Trans. Inst. Metal Finishing, 1963, vol. 40, pp. 93–97.

MURRAY TILLMAN, Primary Examiner

A. H. KOECKERT, Assistant Examiner

U.S. Cl. X.R.

204—181; 260—29.2 M